(12) United States Patent
Kruse

(10) Patent No.: US 6,879,240 B2
(45) Date of Patent: Apr. 12, 2005

(54) BALL JOINT WITH INTEGRATED ANGLE SENSOR

(75) Inventor: Jochen Kruse, Osnabrück (DE)

(73) Assignee: ZF Lenförder Metallwaren AG, Stemwede-Dielingen (DE)

( * ) Notice: Subject to any disclaimer, the term of this patent is extended or adjusted under 35 U.S.C. 154(b) by 0 days.

(21) Appl. No.: 10/380,613

(22) PCT Filed: Jun. 19, 2002

(86) PCT No.: PCT/DE02/02245

§ 371 (c)(1),
(2), (4) Date: Mar. 13, 2003

(87) PCT Pub. No.: WO03/008819

PCT Pub. Date: Jan. 30, 2003

(65) Prior Publication Data

US 2004/0100357 A1 May 27, 2004

(30) Foreign Application Priority Data

Jul. 18, 2001 (DE) .......................................... 101 34 259

(51) Int. Cl.⁷ ............................................. H01C 10/14
(52) U.S. Cl. ........................................ 338/12; 338/128
(58) Field of Search ................................... 338/12, 128

(56) References Cited

U.S. PATENT DOCUMENTS

| 3,699,398 A | * | 10/1972 | Newmeyer ................... 361/179 |
| 4,500,867 A | | 2/1985 | Ishitobi et al. |
| 4,726,746 A | * | 2/1988 | Takada et al. ............ 417/423.1 |
| 4,853,045 A | * | 8/1989 | Rozendaal ................... 148/103 |
| 4,901,571 A | * | 2/1990 | Reinhardt et al. ........ 73/514.12 |
| 4,988,116 A | * | 1/1991 | Evertsen ..................... 280/477 |
| 5,712,478 A | * | 1/1998 | Olsson .................. 250/231.13 |
| 5,776,171 A | * | 7/1998 | Peckham et al. .............. 607/48 |
| 5,831,554 A | * | 11/1998 | Hedayat et al. ............... 341/20 |
| 2003/0107502 A1 | * | 6/2003 | Alexander et al. ............ 341/34 |

FOREIGN PATENT DOCUMENTS

| DE | 197 33 719 | | 4/1999 | |
| EP | 0 617 260 A1 | | 9/1994 | |
| EP | 0 617 260 B1 | | 9/1994 | |
| JP | 63-125817 | * | 5/1980 | ................. 403/120 |
| JP | 63-292001 | * | 11/1988 | ................. 324/71.1 |
| JP | 11271014 | | 10/1999 | |
| WO | WO 01/57639 | | 8/2001 | |

OTHER PUBLICATIONS

11–271014 Pub No. Japaneses Machine to English translation, Keisuke et al. (Oct. 1999).*

* cited by examiner

Primary Examiner—Karl D. Easthom
(74) Attorney, Agent, or Firm—McGlew and Tuttle, P.C.

(57) ABSTRACT

A ball-and-socket joint with integrated angle sensor for a motor vehicle, especially for the chassis of the motor vehicle is created. The ball-and-socket joint has a ball-and-socket joint housing (6) provided with a joint opening (7), a ball pivot (1) having a joint ball (2) and a pin (3), which is mounted, with its joint ball (2), rotatably and pivotably in a hollow-ball-shaped bearing surface in the ball-and-socket joint housing (6), and projects, with its pin (3), through the joint opening (7) out of the ball-and-socket joint housing (6). A two-pole field transducer (5) is provided at the end of the joint ball (2) facing away from the pin (3). The poles of the field transducer (5) are arranged on the ball surface. In this case, at least two field sensors (13) are arranged at a distance from one another with respect to the meridian plane defined by the large circle on the hollow-ball-shaped bearing surface running at right angles to the bearing longitudinal axis in the area or on the ball-and-socket joint housing (6) facing away from the joint opening, and interact with the field produced by the field transducer (5).

36 Claims, 1 Drawing Sheet

BALL JOINT WITH INTEGRATED ANGLE SENSOR

FIELD OF THE INVENTION

The present invention pertains to a ball-and-socket joint for a motor vehicle, and particularly for the chassis of the motor vehicle, with a ball-and-socket joint housing provided with a joint opening, a ball pivot having a joint ball and a pin, which ball pivot is mounted, with its joint ball, rotatably and pivotably in a hollow-ball-shaped bearing surface in the ball-and-socket joint housing and projects, with its pin, through the joint opening out of the ball-and-socket joint housing, and a two-pole field transducer provided at the end of the joint ball facing away from the pin, whose poles are arranged on the ball surface.

BACKGROUND OF THE INVENTION

Such a ball-and-socket joint is known from EP 0 617 260 B1, in which case a permanent magnet is arranged on the ball as the field transducer. In the area of the housing directly opposite the magnet in the unejected state of the ball pivot, a magnetoresistive sensor is arranged such that this sensor interacts with the magnetic field produced by the permanent magnet. A rotation of the unejected ball pivot around its longitudinal axis can be detected by means of the magnetoresistive sensor, in which case the angle detected can be used, e.g., for light range regulation in the motor vehicle.

Such a ball-and-socket joint has the drawback that the pivoting movements of the ball pivot can be detected only with unsatisfactory accuracy. Here, pivoting is defined as a movement, in which the ball pivot changes the spatial position of its axis of symmetry or central axis in relation to the ball-and-socket joint housing.

SUMMARY OF THE INVENTION

The object of the present invention is to create a ball-and-socket joint for a motor vehicle, in which the pivot angle in at least one pivot direction can be determined with high accuracy.

The ball-and-socket joint according to the present invention for a motor vehicle, and particularly for the chassis of the motor vehicle, has a ball-and-socket joint housing provided with a joint opening, a ball pivot having a joint ball and a pin, which ball pivot is mounted with its joint ball rotatably and pivotably in a hollow-ball-shaped bearing surface in the ball-and-socket joint housing and projects, with its pin, through the joint opening out of the ball-and-socket joint housing, and a two-pole field transducer provided at the end of the joint ball facing away from the pin, whose poles are arranged on or in the area of the ball surface. In this case, at least two field sensors are arranged at a distance from one another with respect to the meridian plane defined by the large circle on the hollow-ball-shaped bearing surface or on the joint ball running at right angles to the bearing longitudinal axis in the area facing away from the joint opening in or on the ball-and-socket joint housing and interact with the field produced by the field transducer.

Via the arrangement of the two field sensors in or on the ball-and-socket joint housing, the spatial pivot area of the ball pivot that can be detected via the field sensors can be adjusted. Preferably, the two field sensors are diametrically opposite one another with respect to the longitudinal axis of the ball-and-socket joint housing. By means of this arrangement, the accuracy of the detectable pivot angle is particularly high with respect to a pivoting movement around the pivoting axis running at right angles to the connecting line of the two field sensors and to the longitudinal axis of the ball-and-socket joint housing.

By the two different poles of the field transducer being arranged on or in the area of the ball surface, not only a pivoting but also a rotation of the ball pivot about its central axis can be detected by the field sensors.

In ball-and-socket joints, whose ball pivots are primarily pivoted only in a single pivoting axis, two field sensors are satisfactory for detecting the pivot angle. If, however, the ball pivot is additionally pivoted about a pivoting axis other than this single one, the determination of the exact spatial position of the ball pivot in relation to the ball-and-socket joint housing may be linked with undesired inaccuracies.

Therefore, a third field sensor, which is arranged with respect to the meridian plane in the area in or on the ball-and-socket joint housing facing away from the joint opening at a distance from the other two field sensors and not lying on a straight line with same, interacts with the field produced by the field transducer. According to this embodiment, it is possible to detect any spatial position of the ball pivot in relation to the ball-and-socket joint housing accurately.

The position of each field sensor in the ball-and-socket joint housing may be made dependent on the pivot area of the ball pivot to be detected. However, the field sensors are preferably arranged, such that, with respect to the circle defined by the three field sensors, two adjacent field sensors define, each, a circle sector with a central angle of 120°, whereby the central point of this circle, which runs parallel to the meridian plane, lies on the longitudinal axis of the ball-and-socket joint housing. The field sensors, according to this embodiment, are arranged distributed uniformly around the joint ball so that an especially large spatial area can be monitored by the field sensors.

Depending on the field sensors used, it is possible that the spatial position of the ball pivot in relation to the ball-and-socket joint housing can no longer be clearly detected if the field transducer is in the area between the circle defined by the field sensors and the meridian plane. Therefore, the field sensors are preferably arranged, such that a straight line, running through one of the sensors and the central point of the hollow ball or the joint ball forms at least the same angle with the longitudinal axis of the ball-and-socket joint housing as the central axis of the ball pivot with the longitudinal axis of the ball-and-socket joint housing in case of maximum excursion of the ball pivot limited by the ball-and-socket joint housing. With such an arrangement of the sensors, an angle detection is possible over the entire pivoting range of the ball pivot.

The field transducer may be designed in the form of an electrical dipole, whereby the field sensors are designed for detecting the field coming from the dipole. Such an arrangement has the drawback that an energy supply to the field transducer must be guaranteed for maintaining the electrical field. Therefore, the field transducer is preferably designed as a permanent magnet and the field sensors as magnetic field sensors, which can send an electrical signal, characterizing the detected magnetic field of the permanent magnet, to an evaluation device, whereby the magnetic field sensors may be formed by conventional magnetic sensors, e.g., Hall effect sensors or by magnetoresistive sensors. No energy supply is necessary for the permanent magnet, so that an electrical contacting of the joint pin or the use of a battery in the joint pin for operating the ball-and-socket joint according to the present invention is not needed. Further, the magnetic field is for the most part not affected by the grease that is frequently used in ball-and-socket joints.

The permanent magnet may be made of generally known permanent magnet materials, such as, e.g., of Alniko 500 or barium ferrite. However, the permanent magnet is preferably made of materials having a high quality factor $(BH)_{max}$, such as $SmCo_5$, $Sm_2Co_{17}$, $Nd_2Fe_{14}B$ or similar materials.

If the ball-and-socket joint housing and/or the ball pivot are made of a ferromagnetic material, the measurement of the magnetic field caused by the permanent magnet by means of the magnetic field sensors may be adversely affected by this material. Therefore, the ball-and-socket joint housing and/or the ball pivot are preferably made of a diamagnetic or a paramagnetic material.

The joint ball may be mounted directly in the ball-and-socket joint housing. However, it is also possible to mount the joint ball in the ball-and-socket joint housing through the intermediary of a bearing shell made of a non-ferromagnetic material, such as, e.g., plastic or ceramic.

The present invention is described below based on a preferred embodiment with reference to the drawing. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
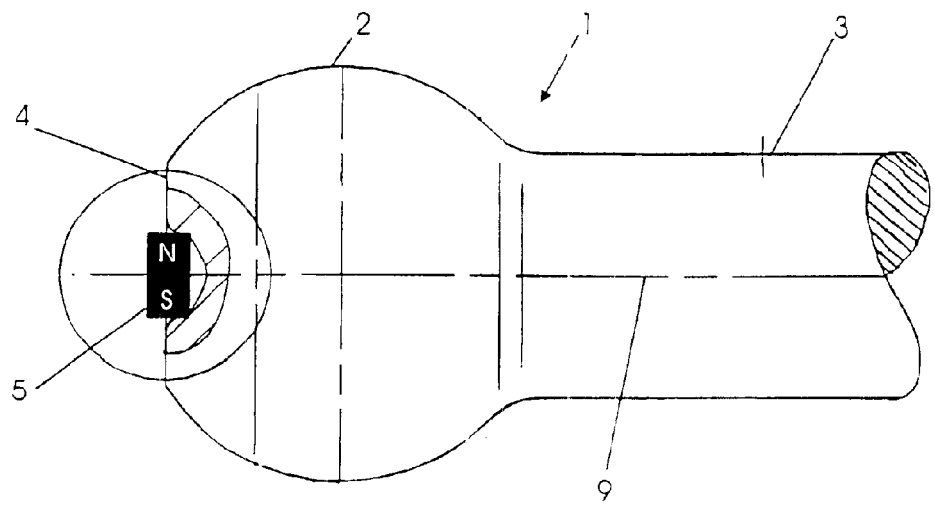
FIG. 1 is a partially cut-off view of a ball pivot of an embodiment of the ball-and-socket joint according to the present invention.

Referring to the drawings in particular, FIG. 1 shows a ball pivot 1 according to an embodiment of the ball-and-socket joint according to the present invention. The ball pivot 1 has a joint ball 2 and a pin 3. The joint ball 2, at its end facing away from the pin 3, has a flattened area 4, in the center of which a permanent magnet 5 is mounted in a recess provided in the joint ball 2, whereby, in the figure, the north pole of the permanent magnet 5 is designated by the letter "N" and the south pole of the permanent magnet 5 is designated by the letter "S." The permanent magnet 5 is arranged with its two poles N and S on the surface of the flattened area such that these poles have the same distance to the central point of the joint ball 2.

Figure 2:
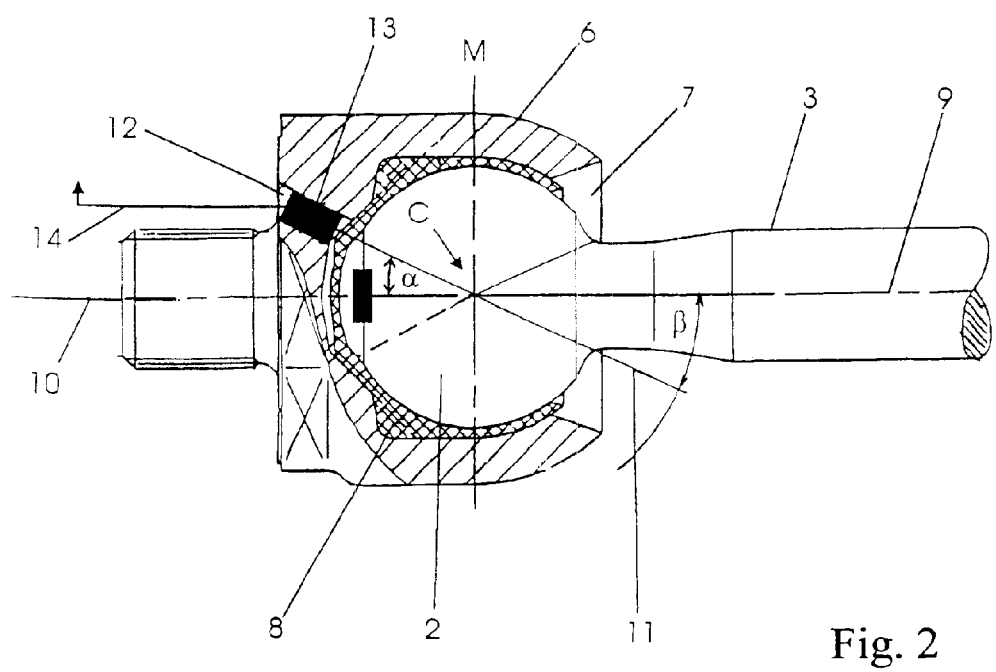
FIG. 2 is a ball-and-socket joint according to the embodiment according to FIG. 1 with a partially cut-open housing.

FIG. 2 shows the embodiment of a ball-and-socket joint according to the present invention in the assembled state, whereby the ball pivot 1 is pivotably mounted in a ball-and-socket joint housing 6. The ball pivot 1 projects, with its pin 3, from a joint opening 7 provided in the ball-and-socket joint housing 6 (shown partially cut off), and is mounted, with its joint ball, through the intermediary of a bearing shell 8 made of plastic in the ball-and-socket joint housing 6. In this case, the hollow-ball-shaped bearing surface necessary for mounting the joint ball 2 is the edge of formed by the inner surface of the bearing shell 8, whereby the central point C of the joint ball 2 coincides with the central point of the hollow-ball-shaped bearing surface.

According to FIG. 2, the ball pivot 1 is shown in an unejected position, such that the central axis 9 of the ball pivot 1 coincides with the longitudinal axis 10 of the ball-and-socket joint. The excursion of the ball pivot 1 in relation to the ball-and-socket joint housing 6 is limited by the joint opening 7 formed by the ball-and-socket joint housing 6, whereby the maximum possible excursion of the ball pivot 1 is indicated in the figure by the straight line 11 and the angle β. The straight line 11 characterizes a position of the central axis 9 of the ball pivot 1 in case of maximum excursion.

Three recesses 12, of which only one is shown in the figure, are provided in the ball-and-socket joint housing 6. A magnetic field sensor 13, which is designed as a Hall sensor according to the embodiment, is introduced into each of these recesses. The sensors 13 are arranged on a circle running parallel to the meridian plane M, whose central point lies on the bearing longitudinal axis 10, such that two adjacent sensors 13 together with the central point of this circle each define a circle segment with a central angle of 120°. Further, the sensors 13 are aligned with the central point C of the joint ball 2, whereby the marked direction of detection (main direction of detection) of each of the sensors 13 forms an angle α with the longitudinal axis 10 of the ball-and-socket joint. Since α=β according to the embodiment, whereby p characterizes the maximum excursion of the ball pivot, the main direction of detection for the sensor 13 shown in the figure lies thus on the straight line 11.

If the ball pivot is pivoted, then the permanent magnet is also pivoted, which causes a change in the magnetic field produced by the permanent magnet 5 in the detection area of the sensors 13. This change in the magnetic field may be detected by the sensors 13, which send electrical signals which characterize the magnetic field detected via electrical leads 14 to an evaluation device (not shown), from which the spatial position of the ball pivot 1 in relation to the ball-and-socket joint housing 6 is determined by evaluating these electrical signals. In the figure, at one end of the electrical leads 14 is provided an arrowhead, which symbolizes the connection of the electrical leads 14 to the evaluation unit.

The spatial position of the ball pivot 1 in relation to the ball-and-socket joint housing 6 may now be characterized, e.g., by the indication of two pivot angles and an angle of rotation, whereby the angle of rotation indicates the rotation of the ball pivot 1 around the longitudinal axis 10. The two pivot angles each indicate an angle formed between the central axis 9 of the ball pivot 1 and the longitudinal axis 10 of the ball-and-socket joint, whereby these two pivot angles do not lie in the same plane. Preferably, these two pivot angles lie, however, in planes which intersect with a right angle. Thus, the tilting of the ball pivot can simply be categorized into a pivoting in the transverse direction and a pivoting in the longitudinal direction.

Since the position of the ball pivot 1 in space can be determined clearly, then the position of parts connected to one another indirectly or directly via the ball-and-socket joint can also be determined. If the ball-and-socket joint is arranged in the chassis of a motor vehicle, then, e.g., the position of the wheels, the steering amplitude or the spring deflection can be determined. In this case, the ball-and-socket joint can be used, e.g., as a supporting joint or as guiding joint. It is also possible to use the electrical signals sent by the sensors 13 for controlling a level regulation.

While a specific embodiment of the invention has been shown and described in detail to illustrate the application of the principles of the invention, it will be understood that the invention may be embodied otherwise without departing from such principles.

What is claimed is:

1. A ball-and-socket joint for a motor vehicle, the ball-and-socket joint comprising:
    a ball-and-socket joint housing provided with a joint opening;
    a ball pivot having a joint ball and a pin, said ball pivot being mounted with said joint ball rotatably and pivotably in a hollow-ball-shaped bearing surface in said ball-and-socket joint housing and projecting with said pin through said joint opening out of said ball-and-socket joint housing along a ball pivot central axis and said joint ball having an antipodal surface opposite of said projecting pin;
    a two-pole field transducer provided with two poles along a line perpendicular to said ball pivot central axis and directly on said antipodal surface, so as to pivot and rotate with the joint ball;
    at least two field sensors arranged in the area in or on said ball-and-socket joint housing at a distance from one another at least on a plane which is one of parallel and equal with respect to a meridian plane defined by a large circle on the hollow-ball-shaped bearing surface running at right angles to a bearing longitudinal axis running central along the length of said ball-and-socket joint housing and interacting with the field produced by said field transducer.

2. A ball-and-socket joint in accordance with claim 1, further comprising a third field sensor arranged with respect to said meridian plane in the area in or on said ball-and-socket joint housing facing away from said joint opening at a distance from the other two field sensors and not lying on a straight line with same, and interacting with the field that is produced by said field transducer.

3. A ball-and-socket joint in accordance with claim 2, wherein, with respect to a circle defined by the three field sensors, two adjacent field sensors together with the central point of the circle each define a circle sector with a central angle of 120°, whereby said central point of this circle, which runs parallel to said meridian plane lies on said longitudinal axis of said ball-and-socket joint housing.

4. A ball-and-socket joint in accordance with claim 1, wherein a straight line running through one of said sensors and a central point of the hollow ball forms an angle (a) with said longitudinal axis of said ball-and-socket joint housing, said angle (a) being greater than or equal to another angle (b) formed by said ball pivot central axis of said ball pivot with said longitudinal axis of said ball-and-socket joint housing in case of a maximum excursion of said ball pivot limited by said ball-and-socket joint housing.

5. A ball-and-socket joint in accordance with claim 1, wherein said field transducer is designed as a permanent magnet and said field sensors are designed as magnetic field sensors, which send an electrical signal characterizing the magnetic field of said permanent magnet to an evaluation device.

6. A ball-and-socket joint in accordance with claim 5, wherein said permanent magnet is made of $SmCo_5$, $Sm_2Co_{17}$ or $Nd_2Fe_{14}B$.

7. A ball-and-socket joint in accordance with claim 6, wherein said ball-and-socket joint housing is made of a paramagnetic material.

8. A ball-and-socket joint for a motor vehicle chassis, the ball-and-socket joint comprising:
    a ball-and-socket joint housing provided with a joint opening;
    a ball pivot having a joint ball and a pin, said ball pivot being mounted with said joint ball rotatably and pivotably in a hollow-ball-shaped bearing surface in said ball-and-socket joint housing and said pin projecting through said joint opening out of said ball-and-socket joint housing along a ball pivot central axis;
    a two-pole field transducer provided with two poles along a line perpendicular to said ball pivot central axis and directly on an antipodal surface of said joint ball, so as to pivot and rotate with the joint ball;
    a first field sensor and a second field sensor arranged in the area in of on said ball-and-socket joint housing, said first field sensor and said second field sensor being spaced a distance from one another on a field plane at least one of parallel and equal with respect to a meridian plane defined by a circle on the hollow-ball-shaped bearing surface running at right angles to a bearing longitudinal axis running central along the length of said ball-and-socket joint housing and interacting with the field produced by said field transducer.

9. A ball-and-socket joint in accordance with claim 8, further comprising a third field sensor arranged with respect to said meridian plane in the area in or on said ball-and-socket joint housing facing away from said joint opening at a distance from the other two field sensors and not lying on a straight line with same, and interacting with the field that is produced by said field transducer.

10. A ball-and-socket joint in accordance with claim 8, wherein, with respect to a circle defined by the three field sensors, two adjacent field sensors together with the central point of the circle each define a circle sector with a central angle of 120°, whereby said central point of this circle, which rus parallel to said meridian plane lies on said longitudinal axis of said ball-and-socket joint housing.

11. A ball-and-socket joint in accordance with claim 8, wherein a straight line running through one of said sensors and a central point of the hollow ball forms an angle ($\alpha$) with said longitudinal axis of said ball-and-socket joint housing, said angle ($\alpha$) being greater than or equal to another angle ($\beta$) formed by said ball pivot central axis of said ball pivot with said longitudinal axis of said ball-and-socket joint housing in case of a maximum excursion of said ball pivot limited by said ball-and-socket joint housing.

12. A ball-and-socket joint in accordance with claim 8, wherein said field transducer is designed as a permanent magnet and said field sensors are designed as magnetic field sensors, which send an electrical signal characterizing the magnetic field of said permanent magnet to an evaluation device.

13. A ball-and-socket joint in accordance with claim 12, wherein said permanent magnet is made of $SmCo_5$, $Sm_2Co_{17}$ or $Nd_2Fe_{14}B$.

14. A ball-and-socket joint in accordance with claim 13, wherein said ball-and-socket joint housing is made of a paramagnetic material.

15. A ball-and-socket joint comprising:
    a ball-and-socket joint housing including a joint opening;
    a ball pivot including a joint ball and a pin, said joint ball being mounted rotatably and pivotably in a hollow-ball-shaped bearing surface in said ball-and-socket joint housing and said pin projecting along a ball pivot central axis through said joint opening out of said ball-and-socket joint housing;
    a two-pole field transducer provided with two poles along a line perpendicular to said ball pivot central axis and directly on an antipodal surface of said joint ball facing away from said pin, poles of said field transducer being arranged on the ball surface;
    a first field sensor and a second field sensor arranged in the area in or on said ball-and-socket joint housing, said first field sensor and said second field sensor being spaced a distance from one another on a field plane at least one of parallel and equal with respect to a meridian plane defined by a circle on the hollow-ball-shaped bearing surface running at right angles to a bearing longitudinal axis running central along the length of said ball-and-socket joint housing and interacting with the field produced by said field transducer;

a straight line running through one of said sensors and a central point of the hollow ball forms an angle ($\alpha$) with said bearing longitudinal axis of said ball-and-socket joint housing, said angle ($\alpha$) being equal to another angle ($\beta$) formed by said ball pivot central axis of said ball pivot with said bearing longitudinal axis of said ball-and-socket joint housing in case of a maximum excursion of said ball pivot limited by said ball-and-socket joint housing.

16. A ball-and-socket joint according to claim 15, wherein said joint ball, at its end facing away from pin, has a flattened area, in the center of which said two-pole field transducer is mounted in a recess provided in said joint ball.

17. A ball-and-socket joint according to claim 15, wherein said marked direction of detection of each of the sensors forms the angle $\alpha$ with the longitudinal axis of the ball-and-socket joint.

18. A ball-and-socket joint according to claim 15, wherein said hollow ball-shaped bearing surface is formed by the inner surface of a bearing shell made of plastic, the bearing shell being arranged between the joint ball and the ball-and-socket joint housing.

19. A ball-and-socket joint according to claim 15, wherein said field transducer is designed as a permanent magnet.

20. A ball-and-socket joint according to claim 19, wherein said field sensors are formed by Hall effect sensors.

21. A ball-and-socket joint according to claim 15, wherein only one field transducer is directly connected with the joint ball.

22. A ball-and-socket joint according to claim 15, wherein recesses are provided in the ball-and-socket joint housing, the sensors are introduced into said recesses.

23. A ball-and-socket joint according to claim 15, wherein said excursion of said ball pivot in relation to said ball-and-socket joint housing is limited by said joint opening formed by said ball and socket joint housing.

24. A ball-and-socket joint in accordance with claim 15, further comprising a third field sensor arranged with respect to said meridian plane in the area in or on said ball-and-socket joint housing facing away from said joint opening at a distance from the other two field sensors and not lying on a straight line with same, and interacting with the field that is produced by said field transducer.

25. A ball-and-socket joint in accordance with claim 15, wherein, with respect to a circle defined by the three field sensors, two adjacent field sensors together with the central point of the circle each define a circle sector with a central angle of 120°, whereby said central point of this circle, which runs parallel to said meridian plane lies on said longitudinal axis of said ball-and-socket joint housing.

26. A ball-and-socket joint in accordance with claim 15, wherein said field transducer is designed as a permanent magnet and said field sensors are designed as magnetic field sensors, which send an electrical signal characterizing the magnetic field of said permanent magnet to an evaluation device.

27. A ball-and-socket joint in accordance with claim 15, wherein said permanent magnet is at least one of $SmCo_5$, $Sm_2Co_{17}$ and $Nd_2Fe_{14}B$.

28. A ball-and-socket joint in accordance with claim 19, wherein said ball-and-socket joint housing is made of a paramagnetic material.

29. A ball-and-socket joint for a motor vehicle chassis, the ball-and-socket joint comprising:

a ball-and-socket joint housing provided with a joint opening;

a ball pivot having a joint ball and a pin, said ball pivot being mounted with said joint ball rotatably and pivotably in a hollow-ball-shaped bearing surface in said ball-and-socket joint housing and said pin projecting through said joint opening out of said ball-and-socket joint housing along a longitudinal axis;

a two-pole field transducer provided with a first pole and a second pole along a line perpendicular to said longitudinal axis and directly on an antipodal surface of said joint ball, so as to pivot and rotate with the joint ball;

a first field sensor and a second field sensor arranged in the area in or on said ball-and-socket joint housing, said first field sensor and said second field sensor being spaced a distance from one another on a field plane at least one of parallel and equal with respect to a meridian plane defined by a circle on the hollow-ball-shaped bearing surface running at right angles to a bearing longitudinal axis running central along the length of said ball-and-socket joint housing and interacting with the field produced by said field transducer;

the ball-and-socket joint further comprising a third field sensor arranged with respect to said meridian plane in the area in or on said ball-and-socket joint housing at a distance from the other two field sensors and not lying on a straight line with same, and interacting with the field that is produced by said field transducer;

said three field sensors further defining a circle, two adjacent field sensors together with the central point of the circle each define a circle sector with a central angle of 120°, whereby said central point of this circle, which runs parallel to said meridian plane lies on said longitudinal axis of said ball-and-socket joint housing.

30. A ball-and-socket joint according to claim 29, wherein said field transducer is a permanent magnet.

31. A ball-and-socket joint according to claim 29, wherein said field sensors are formed by Hall effect sensors.

32. A ball-and-socket joint in accordance with claim 29, further comprising a third field sensor arranged with respect to said meridian plane in the area in or on said ball-and-socket joint housing facing away from said joint opening at a distance from the other two field sensors and not lying on a straight line with same, and interacting with the field that is produced by said field transducer.

33. A ball-and-socket joint in accordance with claim 29, wherein, with respect to a circle defined by the three field sensors, two adjacent field sensors together with the central point of the circle each define a circle sector with a central angle of 120°, whereby said central point of this circle, which runs parallel to said meridian plane lies on said longitudinal axis of said ball-and-socket joint housing.

34. A ball-and-socket joint in accordance with claim 29, wherein said field transducer is designed as a permanent magnet and said field sensors are designed as magnetic field sensors, which send an electrical signal characterizing the magnetic field of said permanent magnet to an evaluation device.

35. A ball-and-socket joint in accordance with claim 29, wherein said permanent magnet is at least one of $SmCo_5$, $Sm_2CO_{17}$ and $Nd_2Fe_{14}B$.

36. A ball-and-socket joint in accordance with claim 29, wherein said ball-and-socket joint housing is made of a paramagnetic material.

* * * * *